(12) United States Patent
Nagasaka

(10) Patent No.: US 12,002,487 B2
(45) Date of Patent: Jun. 4, 2024

(54) INFORMATION PROCESSING APPARATUS AND INFORMATION PROCESSING METHOD FOR SELECTING A CHARACTER RESPONSE TO A USER BASED ON EMOTION AND INTIMACY

(71) Applicant: SONY GROUP CORPORATION, Tokyo (JP)

(72) Inventor: Hideo Nagasaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 116 days.

(21) Appl. No.: 17/430,755

(22) PCT Filed: Feb. 22, 2019

(86) PCT No.: PCT/JP2019/006855
§ 371 (c)(1),
(2) Date: Aug. 13, 2021

(87) PCT Pub. No.: WO2020/170441
PCT Pub. Date: Aug. 27, 2020

(65) Prior Publication Data
US 2022/0165293 A1 May 26, 2022

(51) Int. Cl.
*G10L 25/63* (2013.01)
*G06T 7/20* (2017.01)
(Continued)

(52) U.S. Cl.
CPC ............. *G10L 25/63* (2013.01); *G06T 7/20* (2013.01); *G06T 13/40* (2013.01); *G10L 13/00* (2013.01); *G10L 15/1815* (2013.01); *G10L 21/06* (2013.01)

(58) Field of Classification Search
CPC ...... G10L 13/00; G10L 21/06; G10L 15/1815
(Continued)

(56) References Cited

U.S. PATENT DOCUMENTS

2003/0149569 A1* 8/2003 Jowitt ................. G10L 21/06
704/E21.02
2010/0082345 A1* 4/2010 Wang ................. G10L 13/00
704/E21.02
(Continued)

FOREIGN PATENT DOCUMENTS

CN 103430217 A 12/2013
EP 2256642 A2 12/2010
(Continued)

OTHER PUBLICATIONS

International Search Report and Written Opinion of PCT Application No. PCT/JP2019/006855, dated Apr. 23, 2019, 09 pages of ISRWO.
Sugawara, et al., "Affect Extraction From Text In Japanese", The 23rd Annual Conference of the Japanese Society for Artificial Intelligence, 2009, 02 pages.

*Primary Examiner* — Farzad Kazeminezhad
(74) *Attorney, Agent, or Firm* — CHIP LAW GROUP

(57) ABSTRACT

Provided are an information processing apparatus, an information processing method, and a program that make it possible to assign more natural motions reflecting the emotions of a character.
[Solving Means]
The information processing apparatus includes a control unit configured to perform the processing of: determining an emotion on the basis of a result of utterance sentence analysis performed on an utterance sentence of a character included in a scenario; selecting, depending on a content of the utterance sentence and the emotion determined, a motion of the character that is synchronized with the utterance sentence; adjusting a character movement speed based on the selected motion and an intimacy between the character and a user; and adding, to the scenario, a description for adjusting presentation of the selected motion to match a voice output timing of the utterance sentence.

12 Claims, 13 Drawing Sheets

(51) Int. Cl.
*G06T 13/40* (2011.01)
*G10L 13/00* (2006.01)
*G10L 15/18* (2013.01)
*G10L 21/06* (2013.01)

(58) Field of Classification Search
USPC .................................................. 704/E21.02
See application file for complete search history.

(56) References Cited

U.S. PATENT DOCUMENTS

2010/0302254 A1 12/2010 Min et al.
2014/0002464 A1 1/2014 Furukawa et al.
2019/0206393 A1* 7/2019 Fang .................. G10L 15/1815

FOREIGN PATENT DOCUMENTS

| JP | 2010-277588 A | 12/2010 |
| JP | 2012-160082 A | 8/2012 |
| JP | 2014-109988 A | 6/2014 |
| JP | 2016-038601 A | 3/2016 |
| KR | 10-2010-0129122 A | 12/2010 |
| KR | 10-2013-0116349 A | 10/2013 |
| WO | 2012/105318 A1 | 8/2012 |

* cited by examiner

FIG. 3
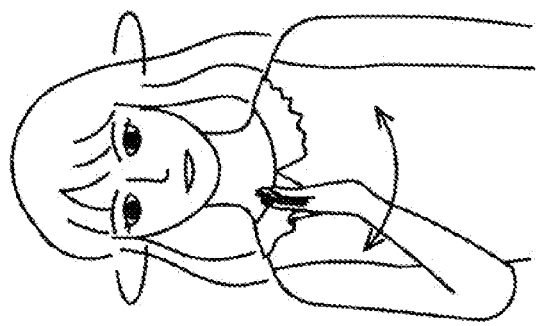
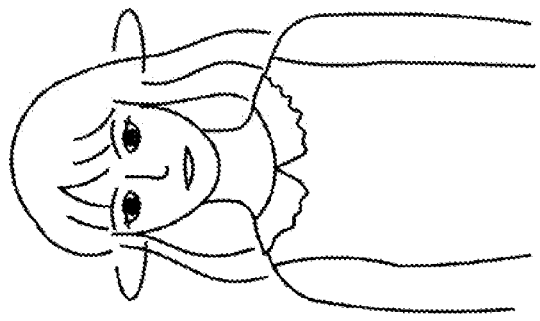
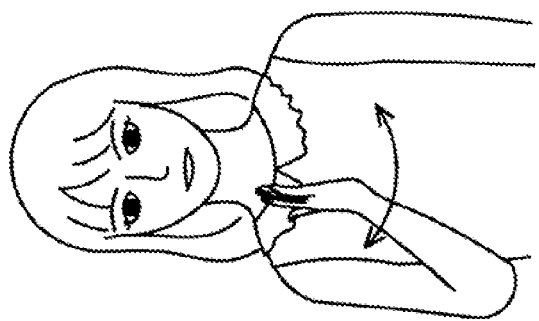

FIG. 10
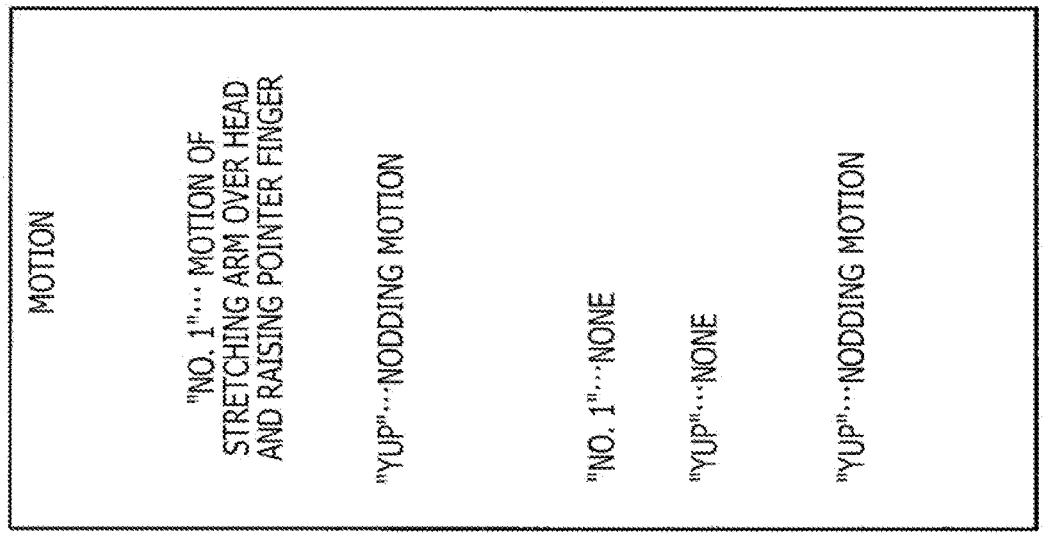
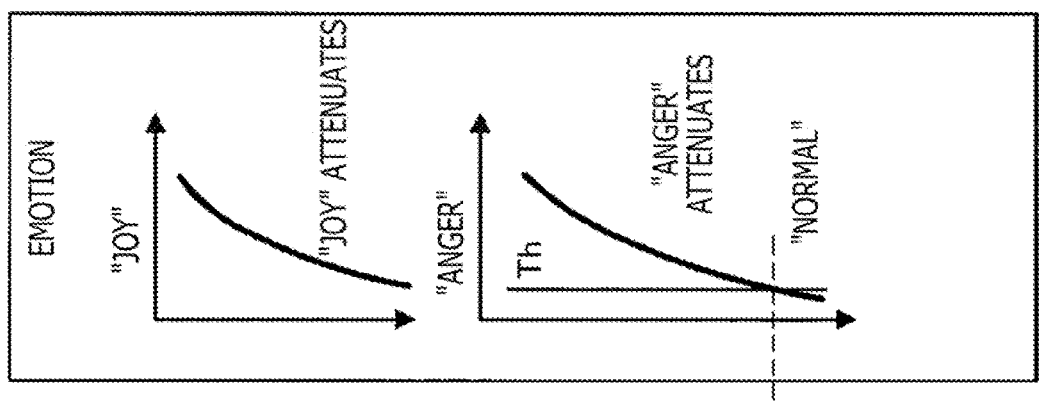
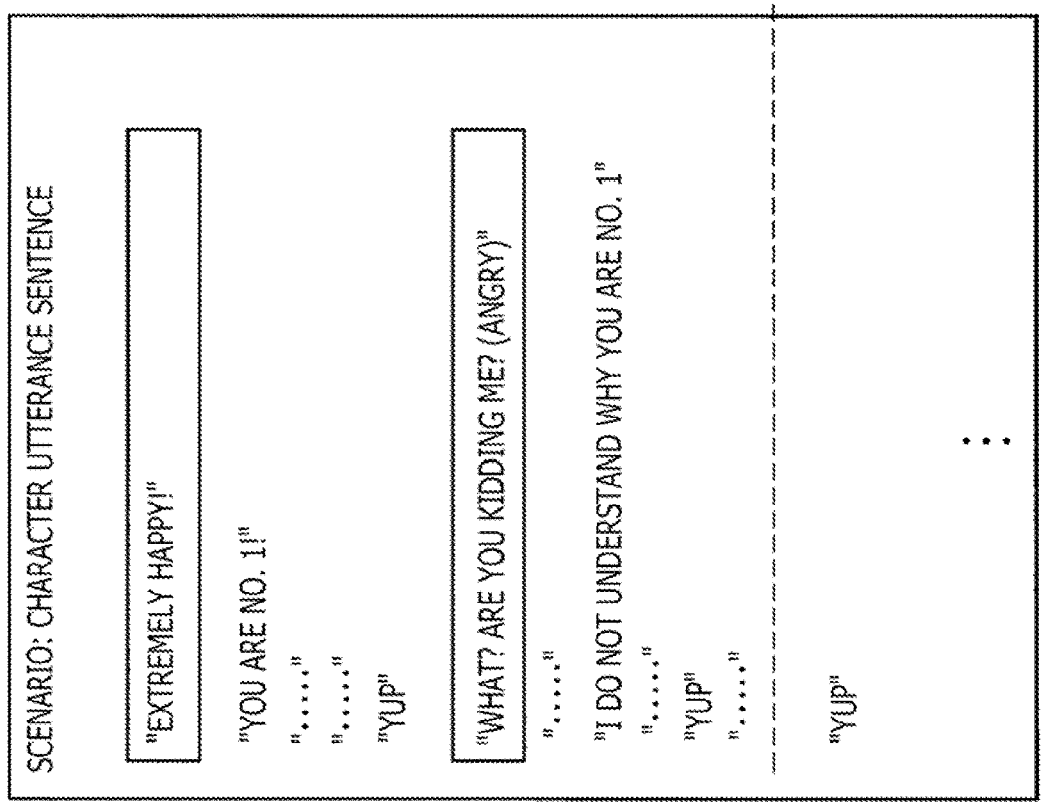

FIG. 11
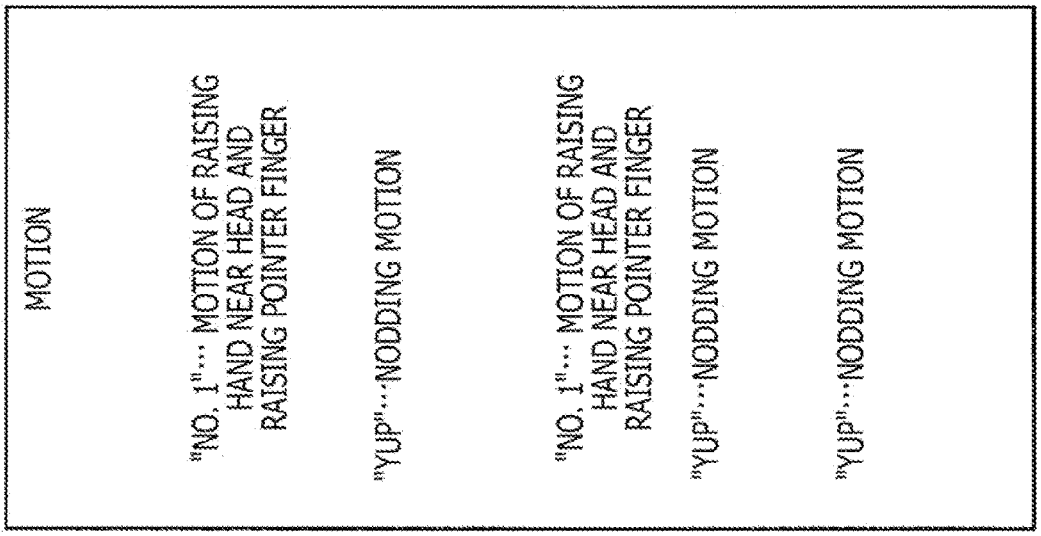
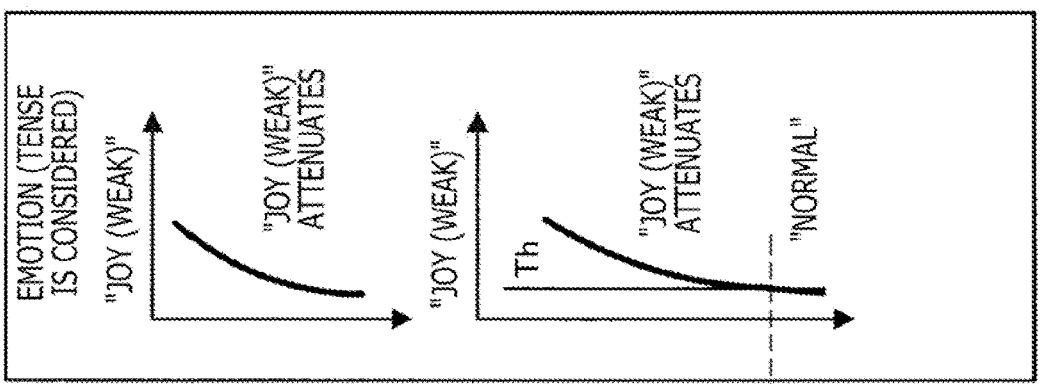
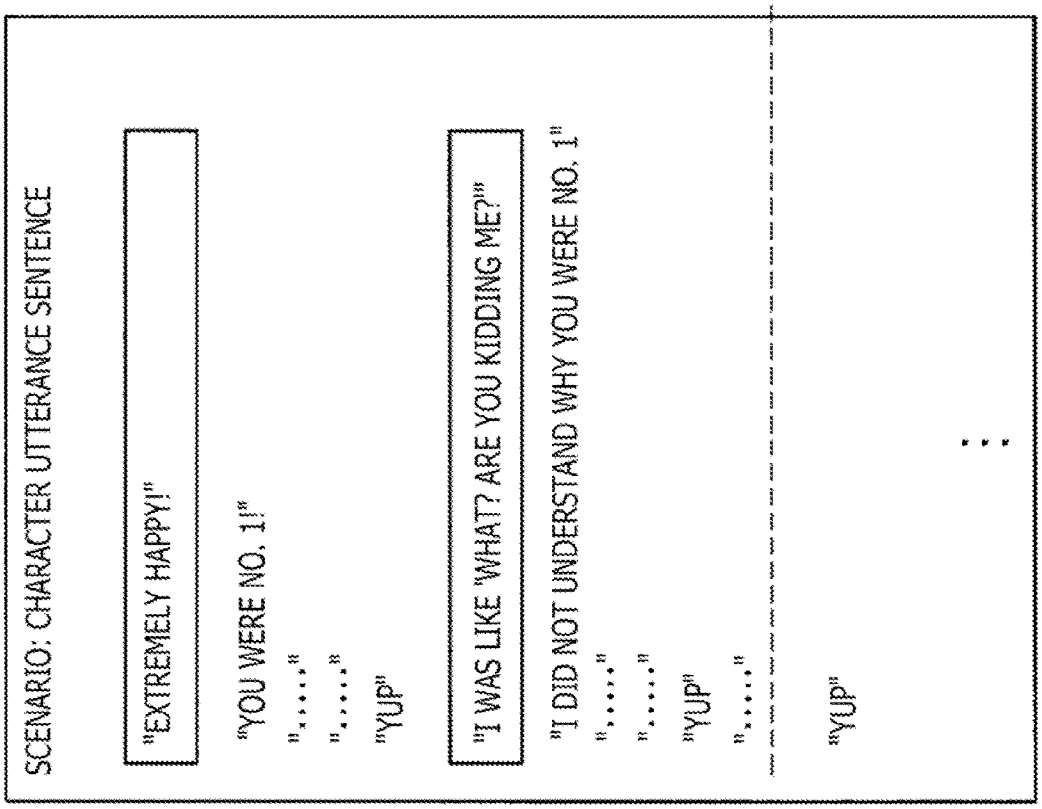

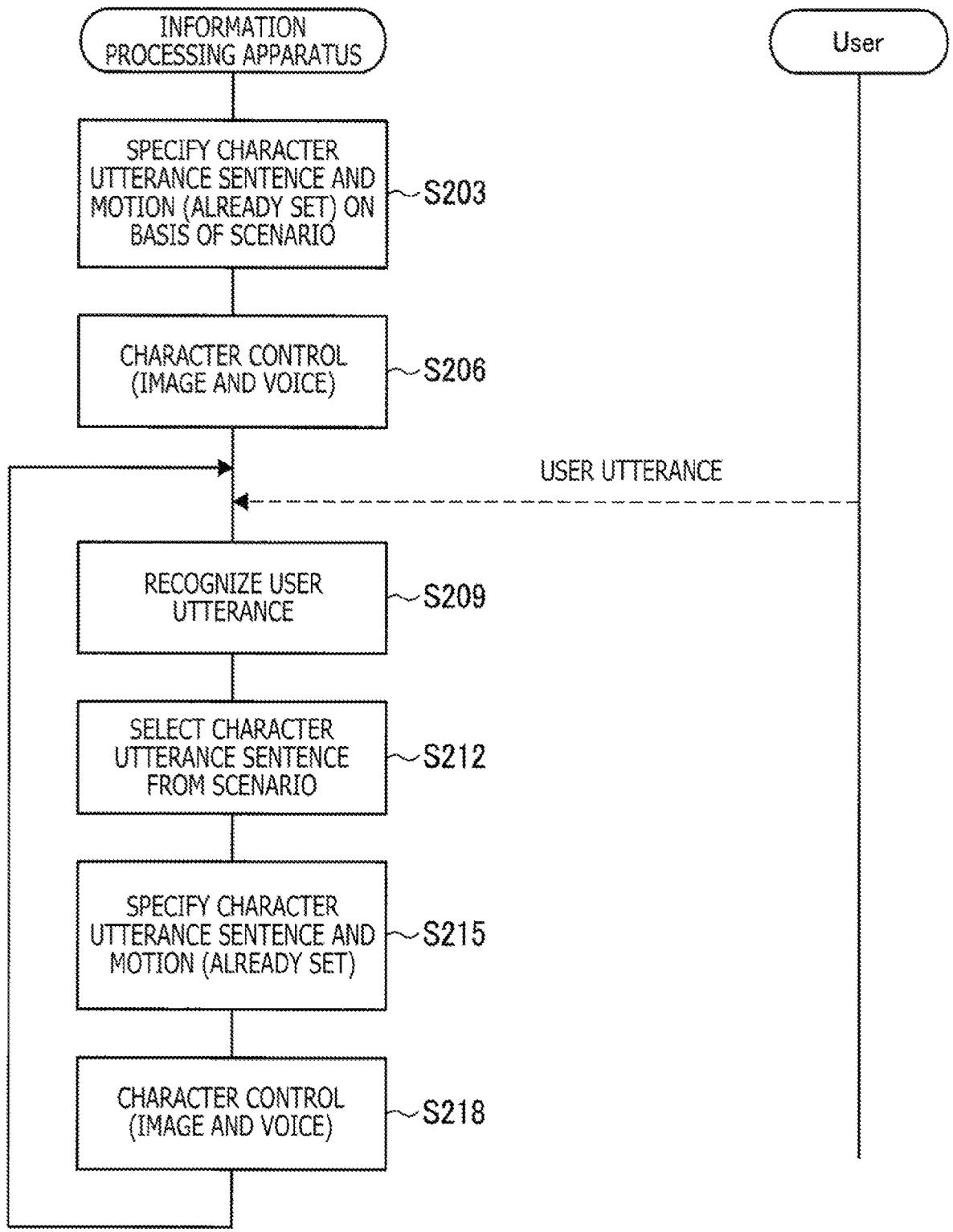

INFORMATION PROCESSING APPARATUS AND INFORMATION PROCESSING METHOD FOR SELECTING A CHARACTER RESPONSE TO A USER BASED ON EMOTION AND INTIMACY

CROSS REFERENCE TO RELATED APPLICATIONS

This application is a U.S. National Phase of International Patent Application No. PCT/JP2019/006855 filed on Feb. 22, 2019. Each of the above-referenced applications is hereby incorporated herein by reference in its entirety.

TECHNICAL FIELD

The present disclosure relates to an information processing apparatus, an information processing method, and a program.

BACKGROUND ART

Hitherto, in creating, for example, animations using CG (computer graphics) characters or the like, generating motion data for reproducing the motion of characters has been highly specialized and time taking.

PTL 1 discloses a technology that adjusts, in generating a sign language animation with a CG character, the parameters of macro data that defines motions corresponding to words included in input text, to thereby generate a natural motion video corresponding to the input sentence.

CITATION LIST

Patent Literature

[PTL 1]
Japanese Patent Laid-Open No. 2014-109988

SUMMARY

Technical Problem

However, it can be said that a motion simply assigned to a word associated therewith in advance such that different motions are taken for the same word depending on the emotion of the moment of the speaker cannot fulfill a role as a motion that is synchronized with the utterance of the character.

Solution to Problem

According to the present disclosure, there is provided an information processing apparatus including a control unit configured to perform processing of determining an emotion on the basis of a result of utterance sentence analysis performed on an utterance sentence of a character included in a scenario, selecting, depending on a content of the utterance sentence and the emotion determined, a motion of the character that is synchronized with the utterance sentence, and adding, to the scenario, a description for adjusting presentation of the selected motion to match a voice output timing of the utterance sentence.

According to the present disclosure, there is provided an information processing method including performing, by a processor, the processing of determining an emotion on the basis of a result of utterance sentence analysis performed on an utterance sentence of a character included in a scenario, selecting, depending on a content of the utterance sentence and the emotion determined, a motion of the character that is synchronized with the utterance sentence, and adding, to the scenario, a description for adjusting presentation of the selected motion to match a voice output timing of the utterance sentence.

According to the present disclosure, there is provided a program for causing a computer to function as a control unit configured to perform the processing of determining an emotion on the basis of a result of utterance sentence analysis performed on an utterance sentence of a character included in a scenario, selecting, depending on a content of the utterance sentence and the emotion determined, a motion of the character that is synchronized with the utterance sentence, and adding, to the scenario, a description for adjusting presentation of the selected motion to match a voice output timing of the utterance sentence.

BRIEF DESCRIPTION OF DRAWINGS

FIG. 3 is a diagram illustrating a plurality of motions corresponding to the word/phrase in an utterance sentence according to the present embodiment.

FIG. 10 is a diagram illustrating specific motion examples that are assigned, depending on the degrees of emotions, to words detected from utterance sentences of the character according to the present embodiment.

FIG. 11 is a diagram illustrating other specific motion examples that are assigned, depending on the degrees of emotions considering the tense, to words detected from utterance sentences of the character according to the present embodiment.

FIG. 13 is a sequence diagram illustrating exemplary scenario control processing according to the present embodiment.

DESCRIPTION OF EMBODIMENT

A preferred embodiment of the present disclosure is described in detail below with reference to the accompanying drawings. Note that, in the present specification and the drawings, components having substantially the same functional configuration are denoted by the same reference signs to omit the overlapping description.

Further, the following items are described in order.

1. Outline of Motion Generation System Configured to Support Utterance Sentence according to Embodiment of Present Disclosure
2. Configuration Example of Information Processing Apparatus 20
3. Motion Processing
(3-1. Motion Generation Processing)
(3-2. Scenario Control Processing)
4. Conclusion

1. Outline of Motion Generation System Configured to Support Utterance Sentence According to Embodiment of Present Disclosure The present embodiment is a system configured to generate the motions of a character that are synchronized with the utterance voice of the character. As the motion object, for example, a 2D or 3D CG character (image) or a robot (real object) is assumed.

However, a method that generates, in generating motions (CG character animations) corresponding to a character utterance sentence generated in advance, a video corresponding to the whole utterance requires an enormous number of man hours and puts a heavy burden on creators.

Accordingly, in a motion generation system according to the present embodiment, an utterance sentence is analyzed, and a motion generated in advance is selected and automatically allocated depending on the detected given word or phrase, to thereby make it possible to facilitate motion generation. For example, the utterance sentence "Watashi to anata desu ka (me and you?)" is broken down as follows by natural language processing, and the word class of each word is determined.

Word decomposition
"Watashi (pronoun)/to (case particle)/anata (pronoun)/ desu (auxiliary verb)/ka (sentence ending particle)"

Figure 2:
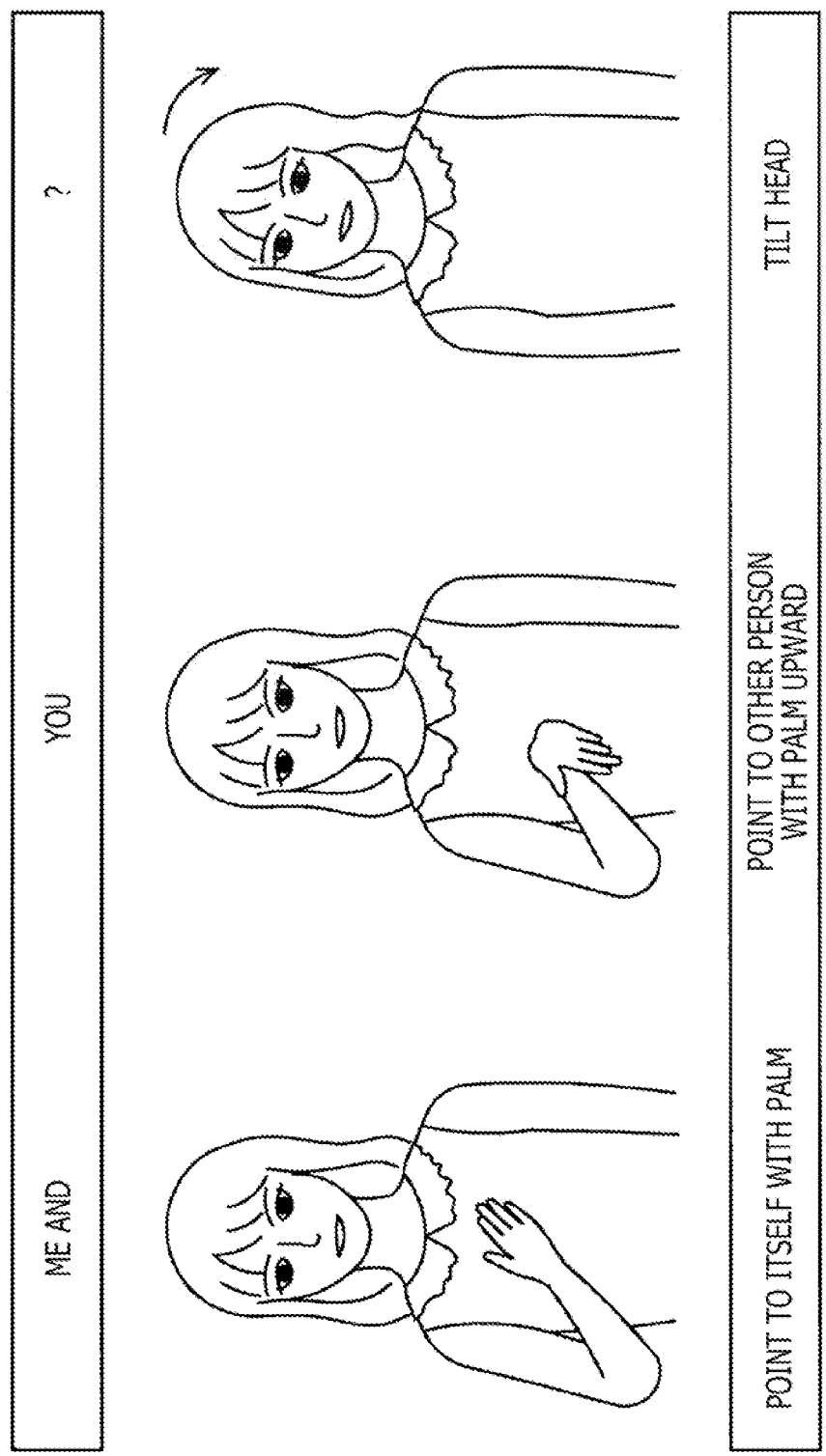
FIG. 2 is a diagram illustrating motions that are assigned to the words/phrases in an utterance sentence according to the present embodiment.

In this case, in the present embodiment, motions as illustrated in FIG. 2 can be assigned on the basis of word-based motion information generated in advance. Here, for example, the following case is assumed: the animation of the motion "touch the body of the character with the palm facing the character" that is assigned to the pronoun "me," the animation of the motion "point to the other person with the open palm upward in front of the body of the character" that is assigned to the pronoun "you," and the animation of the motion "tilt the head to the right" that is assigned to the sentence ending particle that means "question" are generated and registered in advance. In this case, as illustrated in FIG. 2, at timings at which the words in the utterance sentence are read aloud (the utterance voice of the character is output), the respective motions are executed (in a synchronized manner). With this, there is no need to generate a series of animations corresponding to the whole utterance sentence "me and you?" Motions corresponding to respective words are created in advance so that the motions can be appropriately applied to various sentences, with the result that a burden on creators is reduced.

Further, in creating the motions corresponding to the respective words, the words may be grouped and labeled by word class, and the motions may be set on a group-by-group basis. In assigning the motions to utterance words, a label is referred to from the utterance word, and a motion corresponding to the label is referred to. Further, the motions are set per body part of the character and assigned in combination with each other so that the total number of motions to be created can be reduced. Exemplary motions corresponding to the groups are described in Table 1.

TABLE 1

| Utterance word | | Motion | | | |
|---|---|---|---|---|---|
| Interjection | Label | No. | Head | Hand | Upper body |
| No | Rejection | 1 | Shake head (slowly) | — | — |
| | | 2 | Shake head (quickly) | — | — |
| | | 3 | — | Wave hand | — |
| No Nope | Denial | 1 | Shake head (slowly) | — | — |
| | | 2 | Shake head (quickly) | — | — |
| | | 3 | — | Wave hand | — |
| Yes Yup | Agreement | 1 | Nod (once) | — | — |
| | | 2 | Nod (twice) | — | — |
| Really? What? | Question | 1 | Tilt head to right | — | — |
| | | 2 | Tilt head to left | — | — |
| | | 3 | — | — | Lean upper body forward |

Here, even when saying the same word or phrase, people take different motions depending on whether they are "happy" or "sad," and hence it can be said that a motion simply assigned to an associated word or phrase cannot fulfill a role as a motion that is synchronized with the utterance of the character. In contrast to this, in the motion generation system according to the present embodiment, the emotion of the character is further determined and a motion to be assigned to the character is selected depending on the detected given word or phrase and the determined emotion, to thereby make it possible to assign a more natural motion reflecting the emotion of the character.

For example, in this system, a plurality of motions corresponding to a given word or phrase is prepared in advance, and a proper motion is appropriately selected and automatically assigned depending on the emotion of the character and the intensity of the emotion. Now, a description is given with reference to FIG. 3.

FIG. 3 is a diagram illustrating a plurality of exemplary motions corresponding to a word/phrase. For example, as motions corresponding to "No" included in the utterance sentence "No, I am not," three types of motions: the motion "(1) wave its hand in front of its body" (light denial), the motion "(2) shake its head" (normal denial), and the motion "(3) wave its hand in front of its body and shake its head" (strong denial) may be generated in advance, and one of the motions may be selected depending on the emotion of the character and the intensity of the emotion (intensity of "denial"). Further, in this system, a plurality of motions may be combined to be used depending on the emotion of the character or the intensity of the emotion. For example, only the motions (1) and (2) illustrated in FIG. 3 may be generated in advance, and in a case where a strong denial is expressed, the motion (3) that is a combination of (1) and (2) may be reflected in the character.

Figure 4:
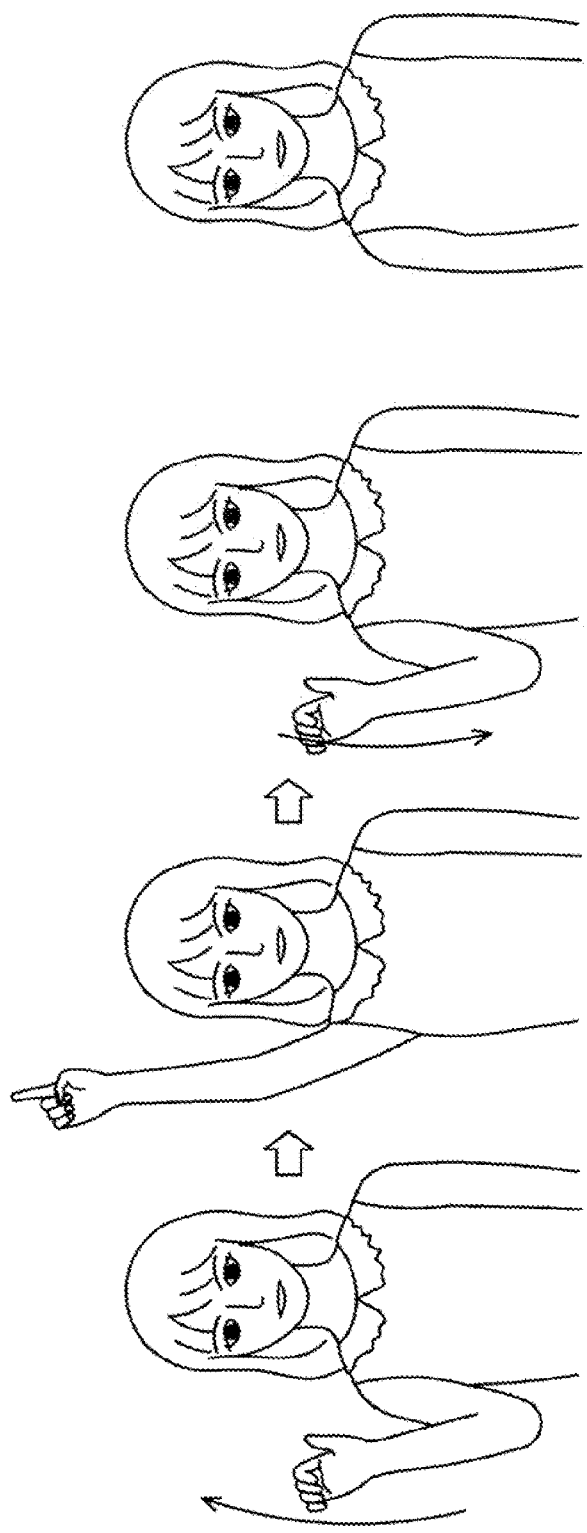
FIG. 4 is a diagram illustrating a series of motions corresponding to the words/phrases in an utterance sentence according to the present embodiment.

Further, in this system, as motions corresponding to words/phrases in an utterance sentence, a series of motions including starting to move, taking a pose, and stopping posing is assumed. In this case, the character desirably completes the pose at a timing at which the character says the corresponding word/phrase. FIG. 4 is a diagram illustrating a series of motions corresponding to the words/phrases in an utterance sentence according to the present embodiment. As illustrated in FIG. 4, for example, in a case where there is a motion to take a pose corresponding to the word "No. 1," it is desired that the motion start slightly before the utterance "No. 1" and the pose be complete at the timing of the start of the utterance "No. 1." Further, big motion posing takes some time from the start to the end and is thus not complete in the word utterance period in some cases. In this system, a timing at which the character starts to stop posing may accordingly be shifted a little (for example, the character may start to stop posing before finishing saying "No. 1").

In the above, the outline of the motion generation system configured to support utterance sentences according to the embodiment of the present disclosure has been described. Subsequently, the configuration of an information processing apparatus 20 that implements the motion generation system configured to support utterance sentences according to the present embodiment is described with reference to the drawings.

2. Configuration Example of Information Processing Apparatus 20

Figure 1:
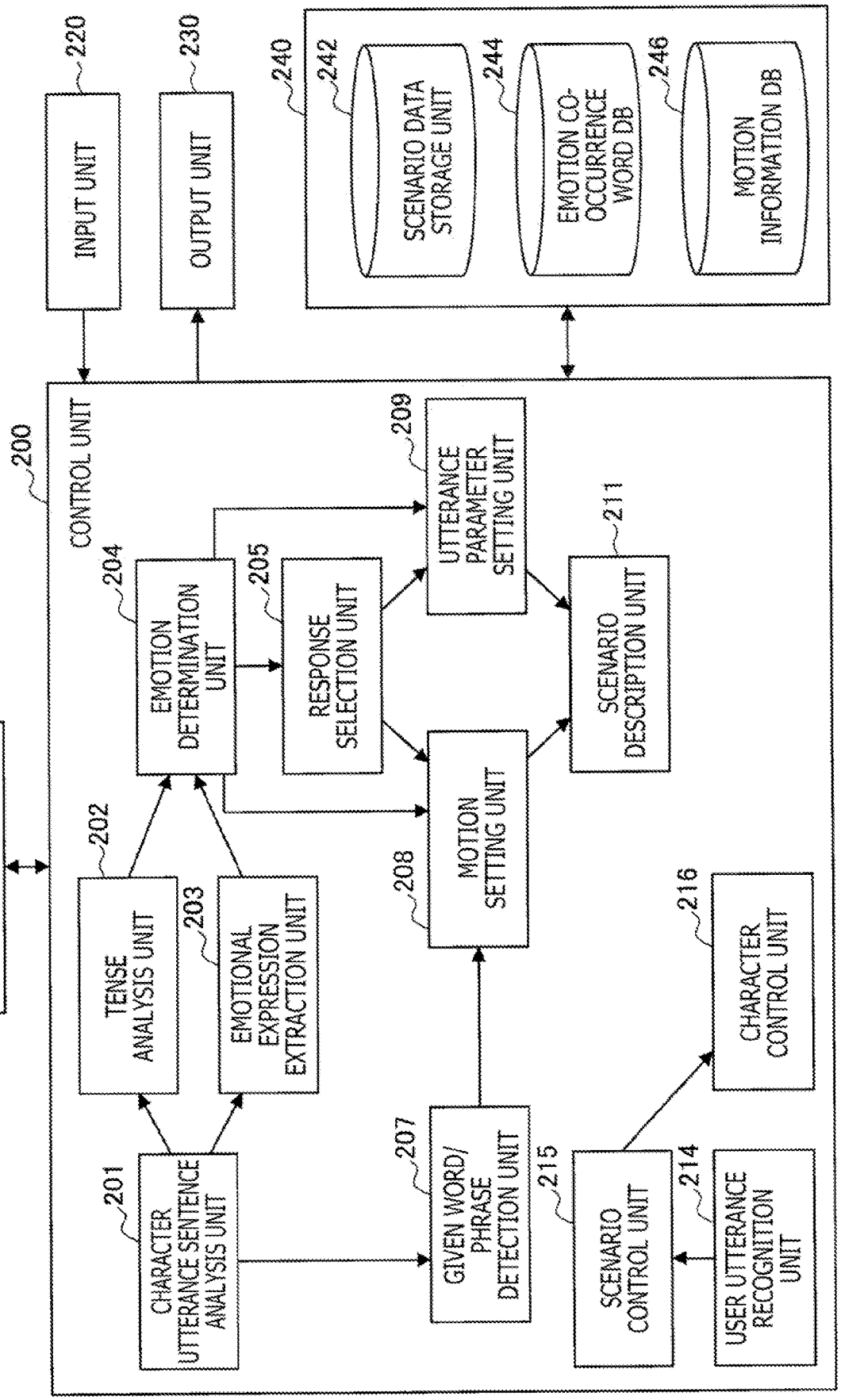
FIG. 1 is a block diagram illustrating a configuration example of an information processing apparatus according to the present embodiment.

FIG. 1 is a block diagram illustrating a configuration example of the information processing apparatus 20 according to the present embodiment. As illustrated in FIG. 1, the information processing apparatus 20 includes a control unit 200, a communication unit 210, an input unit 220, an output unit 230, and a storage unit 240.

(2-1. Control Unit 200)

The control unit 200 functions as an arithmetic processing apparatus and a control apparatus, and controls the entire operation in the information processing apparatus 20 in accordance with various programs. The control unit 200 is implemented by an electronic circuit, for example, a CPU (Central Processing Unit) or a microprocessor. Further, the control unit 200 may include a ROM (Read Only Memory) configured to store programs, arithmetic parameters, or the like that are used and a RAM (Random Access Memory) configured to temporarily store parameters or the like that are appropriately changed.

Further, the control unit 200 according to the present embodiment also functions as a character utterance sentence analysis unit 201, a tense analysis unit 202, an emotional expression extraction unit 203, an emotion determination unit 204, a response selection unit 205, a given word/phrase detection unit 207, a motion setting unit 208, an utterance parameter setting unit 209, a scenario description unit 211, an user utterance recognition unit 214, a scenario control unit 215, and a character control unit 216.

(Character Utterance Sentence Analysis Unit 201)

The character utterance sentence analysis unit 201 acquires the utterance sentence (text) of the character from scenario data (see a scenario data storage unit 242) generated in advance, and performs natural language processing such as word or phrase extraction (word decomposition by morphological analysis, word class determination, or the like), sentence structure analysis, and meaning analysis. Here, the scenario data is data at least including the utterance sentences (text) of the character. The character may make utterances using, for example, "TTS (Text To Speech)" that is a function of reading aloud text by utilizing voice synthesis.

(Tense Analysis Unit 202)

The tense analysis unit 202 analyzes, on the basis of the result of analysis on an utterance sentence, when the event about which the character is talking has been happened, that is, the tense of the event. For example, it is determined that the character is talking about the past in a case where words in "past tense" are used and it is determined that the character is talking about the present in a case where words in "present tense" are used. Further, the tense analysis unit 202 may determine the tense of an utterance sentence on the basis of a temporal expression (for example, "just a little while ago," "yesterday," "a month ago," "last year," "a long time ago," "tomorrow," "next week," "next month," or "now") included in the utterance sentence.

(Emotional Expression Extraction Unit 203)

The emotional expression extraction unit 203 extracts an emotional expression on the basis of the result of analysis on an utterance sentence. For example, a table in which emotions and words expressing the emotions (co-occurrence words) are associated with each other is prepared in advance (see an emotion co-occurrence word DB 244), and an emotional expression is extracted on the basis of a word extracted from an utterance sentence. Examples of the co-occurrence words of "joy" include "fun, inexpensive, and glad," and examples of the co-occurrence words of "impatience" include "sorry, think, and painful." Note that, any emotional expression may be set in advance.

Further, in the present embodiment, the "emotion" classification method is not particularly limited. For example, the eight basic emotions: "joy, trust, fear, surprise, sadness, disgust, anger, and anticipation," and the eight compound emotions each including two of the basic emotions: "optimism, love, submission, awe, disapproval, remorse, contempt, and aggressive" based on the emotion circle by Robert Plutchik may be used.

(Emotion Determination Unit 204)

The emotion determination unit 204 determines the emotion of the character on the basis of the result of analysis on an utterance sentence. Specifically, the emotion determination unit 204 may use the result of extraction by the emotional expression extraction unit 203 as an ultimate character emotion determination result.

Further, the emotion determination unit 204 may make an ultimate emotion determination by further considering the result of analysis on the tense of an utterance sentence by the tense analysis unit 202. That is, the type or degree of an emotion may be changed depending on the tense in some cases. For example, people sometimes talk about sad events such as past failures (events that have created sad emotions) as funny stories. In such a way, emotions in the past are faded or changed over time with exceptions. In determining the emotion of the character, the degree of the emotion is adjusted or the emotion is changed depending on the tense so that a more natural motion can be assigned. Exemplary emotional changes depending on the tense are described in Table 2.

TABLE 2

| Tense | Past | Present | Future |
|---|---|---|---|
| Change | Change in degree of emotion (weak) or emotion type | — | Change in degree of emotion (weak) or emotion type |
| Ex. 1 | Utterance sentence | "I was sad" | "I am sad" | "I will be sad" |
| | Emotion | Sadness (weak) Sadness → joy (weak) | Sadness | Sadness → fear |
| Ex. 2 | Utterance sentence | "It was fun" | "It is fun" | "It will be fun" |
| | Emotion | Joy (weak) | Joy | Joy → anticipation |

Further, the emotion determination unit 204 may determine the change in degree or type of an emotion depending on the tense as described above on the basis of a temporal difference between the time point of the creation of the emotion and the current time point.

Further, the emotion determination unit 204 may exceptionally regard, as the "present" tense, a case where it can be determined from meaning analysis on an utterance sentence (from the context) that remembering an emotion in the past makes the character sad now.

Further, the emotion determination unit 204 may change, in a case where an expression related to "hearsay" or "estimation" is used in an expression indicating an emotion, the degree or type of the emotion since the emotion is not the emotion of the character itself. When people make an emotional expression in talking about a person other than themselves ("It seems that something sad has happened to Mr./Ms. oo," "What is wrong? Are you sad?," or the like), they do not always have the same emotion as the other. Some people feel sad themselves while saying "It seems that something sad has happened to Mr./Ms. oo," some people feel nothing and just talk about it as hearsay, and some people find fun in talking about it out of curiosity. What type of emotion a person feels depends on the relationship with a person about who the person talks (how close they are, whether they know each other or not, or the like), the person's personality, or the like. Accordingly, in determining the emotion of the character from an utterance sentence, in a case where an expression related to "hearsay" or "estimation" is used, the degree or type of the emotion is changed so that a motion based on a more realistic emotion can be assigned. Changes in emotion at this time may be set in advance for each character as the profile of the character.

As the case where "estimation" is used in emotional expressions, for example, a case where the character predicts the feelings of a conversation partner (the user or the like) is assumed.

Here, exemplary emotional changes in a case where expressions related to "hearsay" or "estimation" are used in emotional expressions are described in Table 3.

TABLE 3

| Expression | | Hearsay | Estimation |
|---|---|---|---|
| Change | | Weakened or type is changed | Weakened or type is changed |
| Ex. 1 | Utterance sentence | "I heard he/she is sad" | "You look sad" |
| | Emotion | Sadness (weak) Sadness → joy (weak) | Sadness → fear |

TABLE 3-continued

| Expression | | Hearsay | Estimation |
|---|---|---|---|
| Ex. 2 | Utterance sentence | "It seems fun" | "It may be fun" |
| | Emotion | Joy (weak) | Joy → anticipation |

(Response Selection Unit 205)

In a case where response attitudes are set to the character and the intimacy (relationship) between the character and the user is acquirable, the response selection unit 205 selects a response attitude of the character depending on the intimacy (relationship) between the character and the user. For example, the response selection unit 205 can make, as the character and the user get closer to each other and the intimacy thus increases (the relationship gets better), the character take a motion with a better response attitude (for example, more emotional honest attitude) even for the same emotion. The method of acquiring the intimacy (relationship) between the character and the user is not particularly limited. For example, the intimacy can be acquired on the basis of the number of conversations between the character and the user, the total conversation time, the content of the conversations (the number of questions to the other person), a time that has elapsed from the start, or the progress of the scenario.

Figure 5:
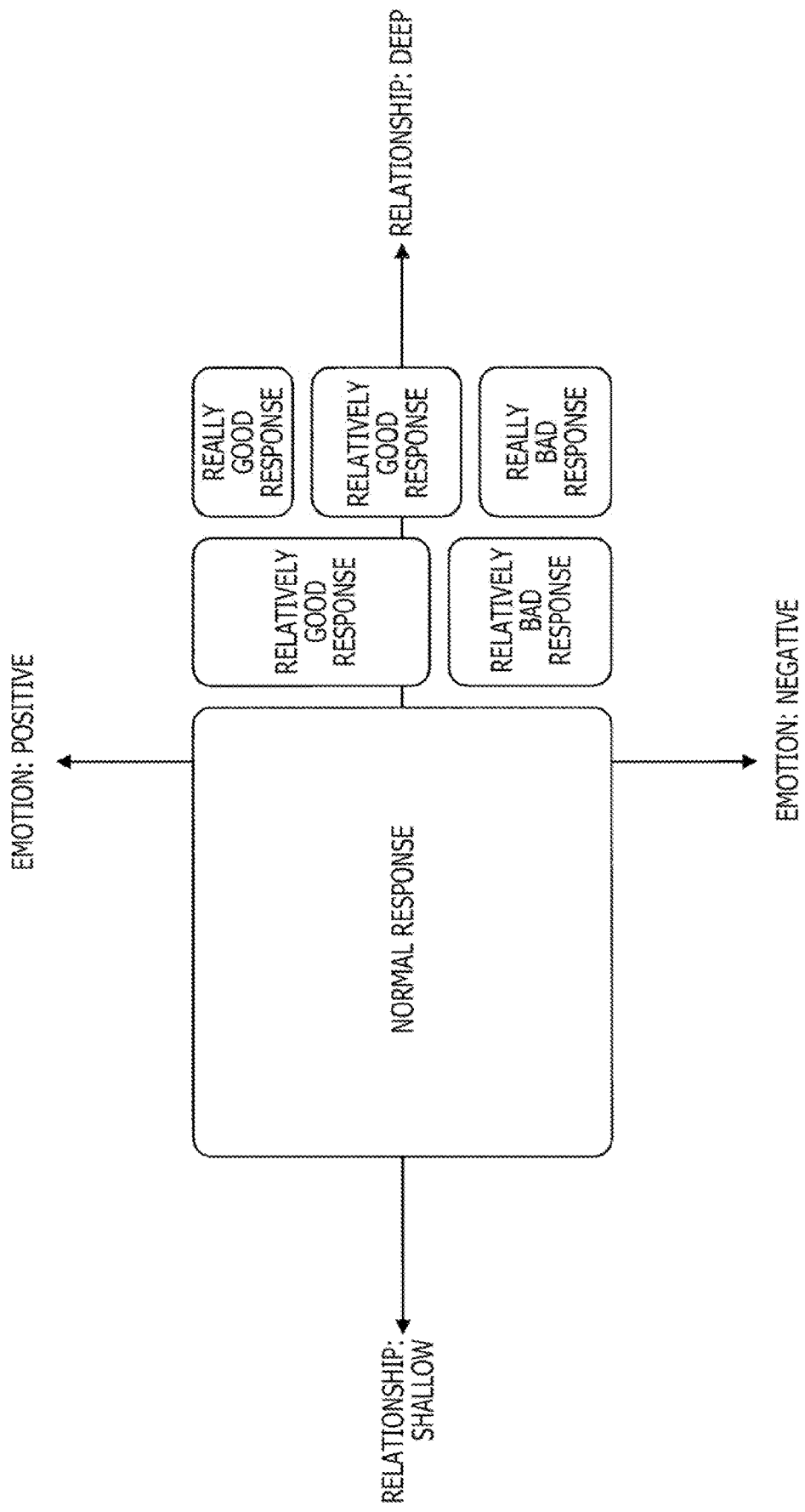
FIG. 5 is a diagram illustrating intimacy-based response attitude pattern selection according to the present embodiment.

Here, FIG. 5 illustrates exemplary intimacy-based response attitude pattern selection according to the present embodiment. The distribution of response patterns may be set for each character.

As illustrated in FIG. 5, on the graph with the vertical axis indicating the positive/negative of emotions and the horizontal axis indicating the deep/shallow of the relationship (intimacy) between the user and the character, there are mapped response patterns (normal response, relatively good response, relatively bad response, really good response, relatively good response, and really bad response) (this data may be set in advance as the profile of the character).

The response selection unit 205 may select a response pattern depending on an emotion determined by the emotion determination unit 204 and the intimacy between the user and the character. The selected response pattern may be considered in motion setting by the motion setting unit 208 and utterance parameter setting by the utterance parameter setting unit 209, which are described later. For example, the character is desirably controlled in terms of motion and utterance such that the character takes a calm attitude for the case of "normal response," a somewhat emotional attitude for the case of "relatively good response," a suppressed angry attitude for the case of "relatively bad response," and a very emotional attitude for the case of "really good response" since the relationship is close. The character always takes a good response attitude for the case of "relatively good response" since the relationship is close, and takes an emotional attitude for the case of "really bad response" since the character trusts the user.

(Given Word/Phrase Detection Unit 207)

The given word/phrase detection unit 207 detects a given word or phrase (for which a motion has been generated in advance) on the basis of the result of analysis on an utterance sentence. Specifically, the given word/phrase detection unit 207 compares words or phrases obtained by decomposition by the character utterance sentence analysis unit 201 to the motion information stored in a motion information database 246 (information regarding motions corresponding to words/phrases), to thereby detect a given word or phrase. At this time, the given word/phrase detection unit 207 detects the given word or phrase in consideration of the word class of the word or a combination of the word classes included in the phrase. Examples of the word class of the word to be detected include verbs, nouns, adjectives, numerals+measure words, conjunctions, interjections, sentence ending particles, and adverbs. Further, the given word to be detected also includes exclamation marks, onomatopoeia, symbols, or signature phrases (phrases unique to the character or the like). Further, the given word/phrase detection unit 207 identifies the position of the given word or phrase detected in the utterance sentence (may identify a time that has elapsed from the start of the utterance or the order (how many words are there before the given word or phrase)).

Note that, in this system, default motions may be set for conjunctions, interjections, sentence ending particles, and exclamation marks, and motions customized to each character may be set for other word classes or signature phrases.

(Motion Setting Unit 208)

The motion setting unit 208 refers to the motion information and sets a motion corresponding to a given word/phrase detected by the given word/phrase detection unit 207. Further, the motion setting unit 208 according to the present embodiment sets a motion to be assigned by further considering an emotion determined by the emotion determination unit 204. In the motion information, one or a plurality of motions is defined for a given word or phrase in advance, and the plurality of motions is associated with respective suitable emotions.

Here, an emotion determined by the emotion determination unit 204 may be regarded as continuing until a certain time has elapsed from the creation of the emotion (the elapsed time may be estimated in consideration of a standard reading speed or the progress of the scenario), the given number of utterances has been given, or a next emotion has appeared. Thus, in the case of a scenario generated in advance, the emotion of the character at each time point in the whole scenario can be analyzed in advance. Now, this is specifically described with reference to FIG. 6.

Figure 6:
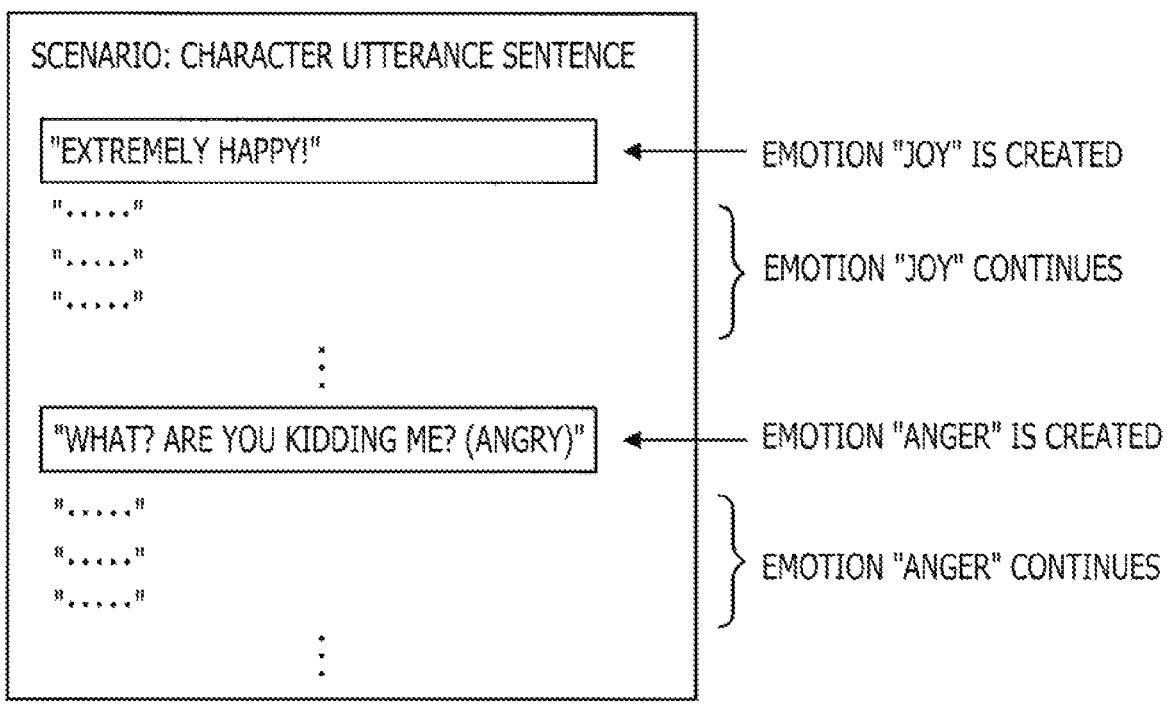
FIG. 6 is a diagram illustrating the continuation of the emotions of a character based on utterance sentences according to the present embodiment.

FIG. 6 is a diagram illustrating the continuation of the emotions of the character based on utterance sentences according to the present embodiment. As illustrated in FIG. 6, for example, in a case where the emotion determination unit 204 determines the emotion "joy" on the basis of the character utterance sentence "extremely happy!," the emotion "joy" is regarded as continuing until a certain time has elapsed thereafter, the given number of utterances has been given, or a next emotion has appeared (in the example illustrated in FIG. 6, the emotion "anger" is created on the basis of the utterance sentence "are you kidding me? (angry)").

Thus, in a case where the motion setting unit 208 selects a motion corresponding to the word/phrase in the utterance sentence in the period during which the emotion "joy" continues, for example, the motion setting unit 208 selects a motion associated with the emotion "joy" from the plurality of motions.

Figure 7:
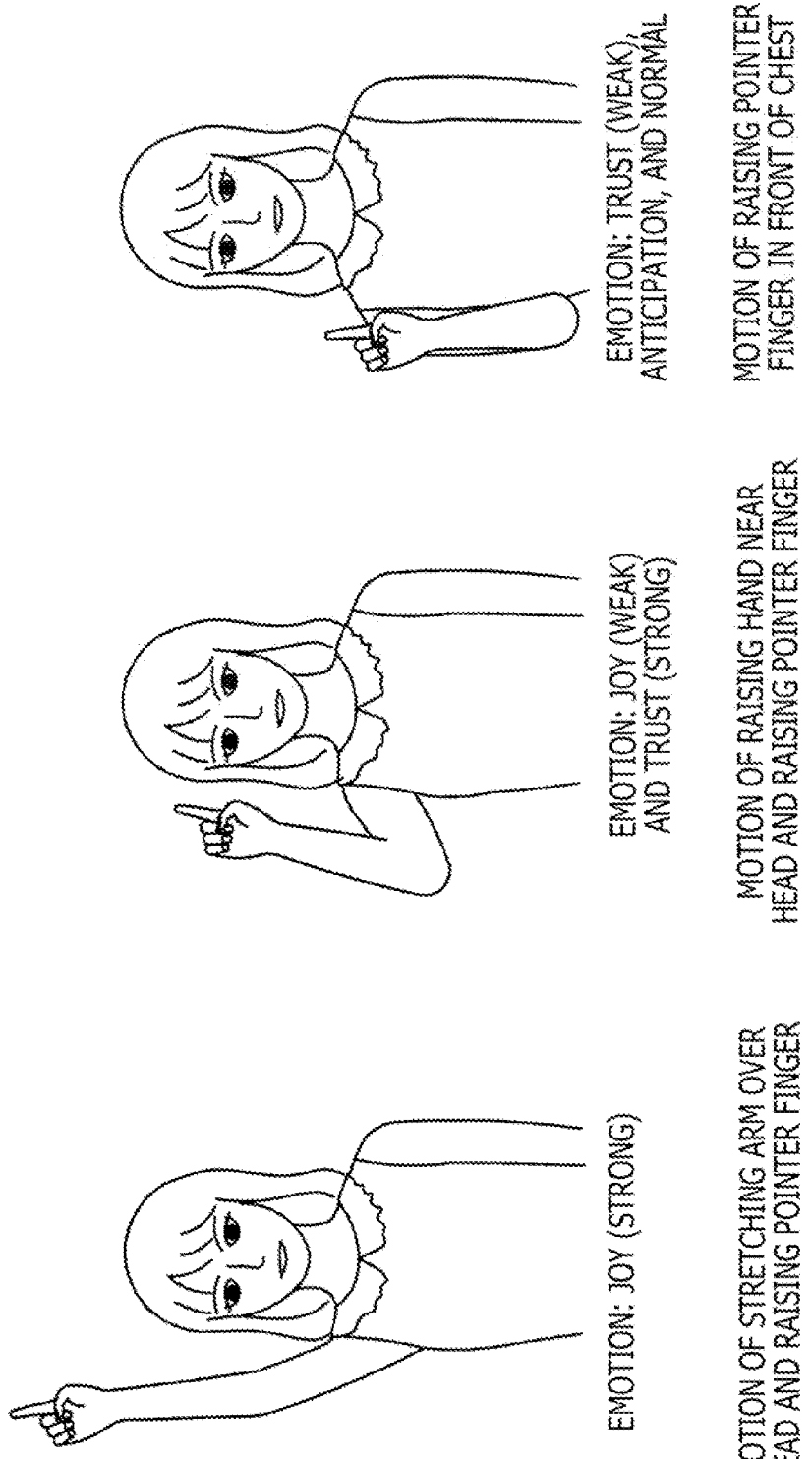
FIG. 7 is a diagram illustrating exemplary emotion-based motions corresponding to the noun "No. 1" according to the present embodiment.

Here, exemplary motion information stored in the motion information database 246 is described in Table 2. Table 4 describes exemplary emotion-based motions corresponding to the utterance word "No. 1" used in an utterance sentence as a noun. Further, examples of the set motions are illustrated in FIG. 7.

TABLE 4

Utterance word: "No. 1" Word class: noun

| Emotion | Motion |
| --- | --- |
| Joy (strong) | Motion of stretching its arm over its head and raising its pointer finger (see the motion illustrated in the left part of FIG. 7) |
| Joy (weak) | Motion of raising its hand near its head and raising its pointer finger (see the motion illustrated in the center part of FIG. 7) |
| Trust (strong) | Motion of raising its hand near its head and raising its pointer finger |
| Trust (weak) | Motion of raising its pointer finger in front of its chest (see the motion illustrated in the right part of FIG. 7) |
| Fear | None |
| Surprise | None |
| Sadness | None |
| Disgust | None |
| Anger | None |
| Anticipation | Motion of raising its pointer finger in front of its chest |
| Normal | Motion of raising its pointer finger in front of its chest |

In this case, the motion setting unit 208 selects, as a motion corresponding to "No. 1 (word class: noun)" detected from the utterance sentence, "motion of stretching its arm over its head and raising its pointer finger" (see the motion illustrated in the left part of FIG. 7) in a case where the character emotion is determined as "joy" by the emotion determination unit 204. Further, the motion setting unit 208 selects, as the motion corresponding to "No. 1 (word class: noun)" detected from the utterance sentence, "motion of raising its pointer finger in front of its chest" (see the motion illustrated in the right part of FIG. 7) in a case where the character emotion is determined as "trust (weak)" by the emotion determination unit 204.

Further, other exemplary motion information stored in the motion information database 246 is described in Table 5. Table 5 describes exemplary emotion-based motions corresponding to the utterance word "yup" used as an interjection representing a response in an utterance sentence.

TABLE 5

Utterance word: "yup" Word class: interjection

| Emotion | Motion |
| --- | --- |
| Joy (strong) | Deeply nod twice |
| Joy (weak) | Nod |
| Trust (strong) | Nod |
| Trust (weak) | Nod |
| Fear | Slightly nod |
| Surprise | None |
| Sadness | None |
| Disgust | None |
| Anger | None |
| Anticipation | Nod |
| Normal | Nod |

Figure 8:
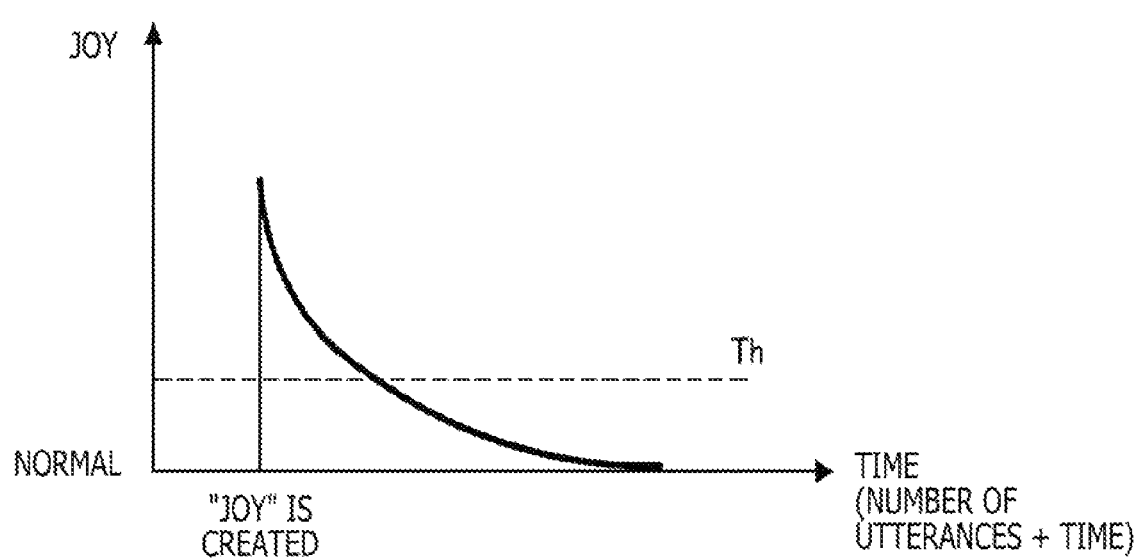
FIG. 8 is a diagram illustrating a case where the degree of an emotion is reduced along with increases in elapsed time and the number of utterances according to the present embodiment.

Further, the degree of an emotion determined by the emotion determination unit 204 may be reduced along with increases in elapsed time and the number of utterances. For example, as illustrated in FIG. 8, in a case where the emotion "joy" is created on the basis of a certain utterance sentence and then the degree of the emotion "joy" is reduced as the time advances (and the number of utterances increases) to fall below a certain threshold, the emotion "normal" may be determined. For example, this corresponds to a case where the character has been angry in the morning but feels better in the evening.

Figure 9:
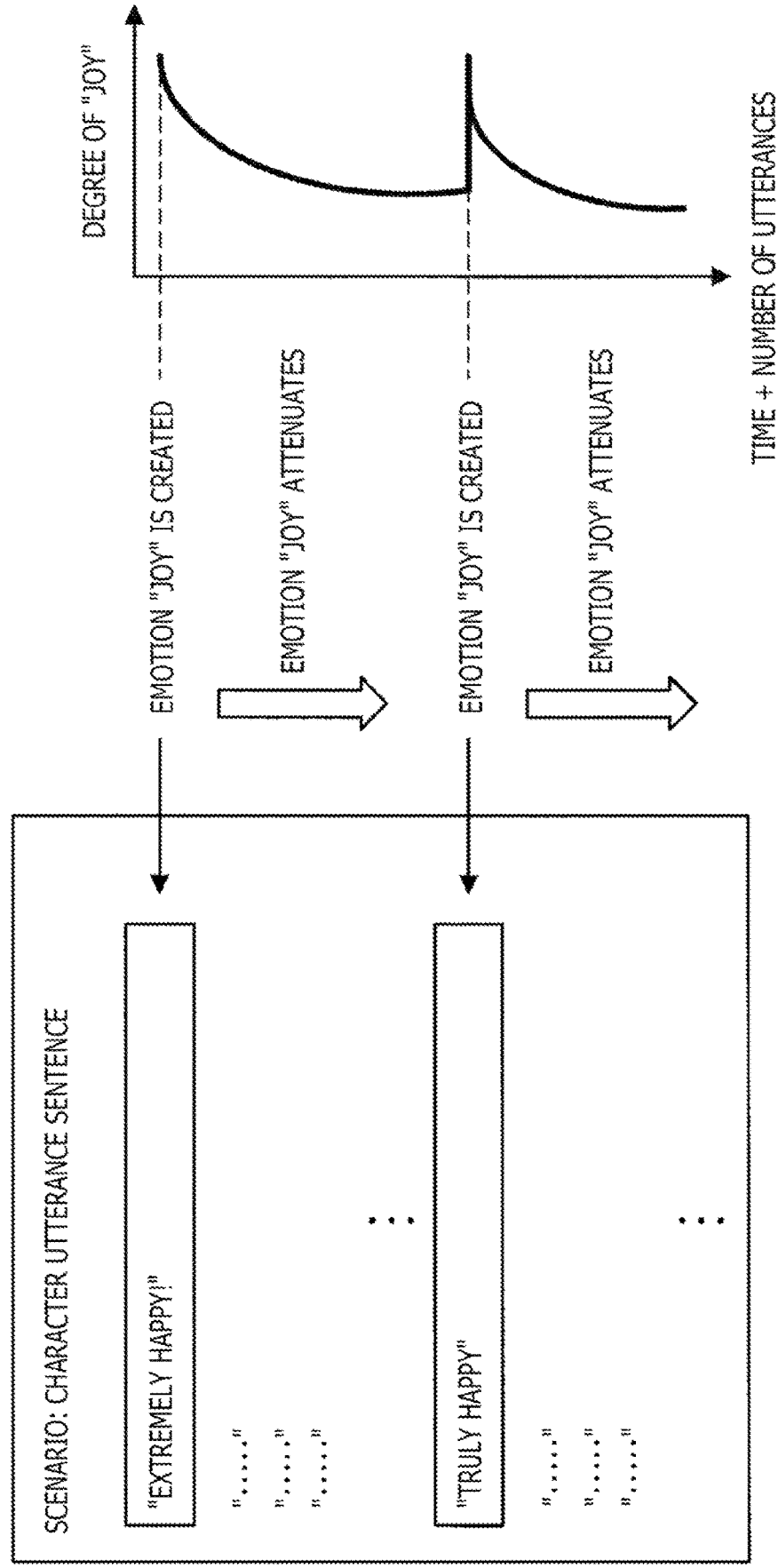
FIG. 9 is a diagram illustrating a case where, while the degree of the emotion is reduced along with increases in elapsed time and the number of utterances, the same emotion is created again according to the present embodiment.

In a case where, while the degree of an emotion (value) is reduced along with increases in elapsed time and the number of utterances, the same emotion is created again, the value may be set again so that the emotion starts to attenuate all over again. For example, as illustrated in FIG. 9, in certain utterance sentences of the character, the emotion "joy" is created from the utterance sentence "extremely happy!," and the emotion "joy" is created again from the utterance sentence "truly happy" while the degree of the emotion is reduced along with increases in elapsed time and the number of utterances, the value of the degree of the emotion "joy" is set again so that the emotion starts to attenuate all over again.

Next, with reference to FIG. 10, there are described specific motion examples that are assigned, depending on the degrees of emotions, to words detected from the utterance sentences of the character according to the present embodiment.

As illustrated in FIG. 10, for example, in a case where it is determined on the basis of the utterance sentence "extremely happy!" of the character that the emotion "joy (strong)" of the character has been created (for example, the emotion "joy" is determined from the word "happy" (noun) and the emotion intensity is determined to be strong from "extremely" (prefix or adjective) and the exclamation mark "!"), the degree of the emotion "joy" is reduced thereafter along with increases in elapsed time and the number of utterances. Then, as a motion corresponding to "No. 1" in the subsequent character utterance sentence "You are No. 1!," the motion setting unit 208 selects a motion corresponding to "joy (strong)" (for example, "motion of stretching its arm over its head and raising its pointer finger" as exemplified in Table 4 described above). Further, as a motion corresponding to the character utterance sentence "yup" that comes after the time further advances, the motion setting unit 208 selects a motion corresponding to "joy (weak)" (the degree of the emotion has been reduced) (for example, "motion of raising its hand near its head and raising its pointer finger" as exemplified in Table 4 described above).

Further, in a case where it is determined on the basis of the subsequent character utterance sentence "Are you kidding me? (angry)" that the character emotion "anger (strong)" has been created, the degree of the emotion "anger" is reduced thereafter along with increases in elapsed time and the number of utterances. Then, since a motion corresponding to "No. 1" in the subsequent character utterance sentence "I do not understand why you are No. 1" is "none" in a case where the character emotion is "anger (strong)" in the example exemplified in Table 4 described above, for example, the motion setting unit 208 gives no motion to the character. Further, since a motion corresponding to the character utterance sentence "yup" that comes after the time further advances is "none" although the character emotion is "anger (weak)" (the degree of the emotion has been reduced) in the example exemplified in Table 4 described above, for example, the motion setting unit 208 gives no motion to the character. Then, a motion corresponding to the utterance sentence "yup" that comes after the time further advances and the degree of the emotion "anger" falls below a threshold to achieve "normal" is "nodding motion" in the example exemplified in Table 4 described above, for example.

Next, with reference to FIG. 11, there are described other specific motion examples that are assigned, depending on the degrees of emotions considering the tense, to words detected from the utterance sentences of the character according to the present embodiment.

As illustrated in FIG. 11, for example, from the utterance sentence "I was extremely happy," the emotion "joy," specifically, "joy (weak)" is determined since the degree of the emotion is regarded as having been reduced due to the past tense. In this case, in selecting a motion corresponding to "No. 1" from the subsequent utterance sentence "You were No. 1," the motion setting unit 208 selects "motion of raising its hand near its head and raising its pointer finger," for example, by considering "joy (weak)."

Further, for example, from the utterance sentence "I was like 'What? Are you kidding me?,'" "joy (weak)" is determined, for example, since the emotion "anger" expressed by the phrase "Are you kidding me?" is regarded as having been changed due to the past tense. Thus, in selecting a motion corresponding to "No. 1" from the subsequent utterance sentence "I did not understand why you were No. 1," the motion setting unit 208 selects "motion of raising its hand near its head and raising its pointer finger," for example, by considering "joy (weak)."

Further, the motion setting unit 208 may adjust the intensity of a set motion depending on a response pattern selected by the response selection unit 205. For example, in a case where the emotion of the character is "joy" and "really good response" has been selected since the relationship is close, the intensity of a motion assigned on the basis of the utterance word and the emotion is increased. Specifically, for example, in a case of making the character take a nodding motion, the motion setting unit 208 makes the character deeply nod (movement width adjustment) or nod more quickly (movement speed adjustment), to thereby make it possible to increase the intensity of the motion.

Further, the intensity of motions may be set on the basis of utterance words. For example, in a case where a word to which a motion has been assigned is with the modifier of a word of emphasis (adverb or adjective), such as "quite" or "very," the motion setting unit 208 makes the motion big. Parameters determining when and how much the intensity of motions is increased may be defined in advance.

Note that, the motion setting unit 208 may set no motion in a case where a given word or phrase has been detected from, for example, the title of a song said by the character to introduce the song, a product name said to introduce the product, or a store name said to introduce the store (that is, proper noun) since it is not desired to assign motions to the utterance of the names. Further, the motion setting unit 208 may present a plurality of motion candidates corresponding to a given word/phrase to the user and assign a motion selected by the user. For example, the motion setting unit 208 can present one or more prepared emotion-based motion candidates corresponding to a given word/phrase to allow the user to select a motion to be assigned.

(Utterance Parameter Setting Unit 209)

The utterance parameter setting unit 209 sets, depending on an emotion determined by the emotion determination unit 204 and a response pattern selected by the response selection unit 205, voice utterance parameters, specifically, utterance tempo (reading speed), a tone of voice (voice pitch and voice type), volume, and the like.

Further, the utterance parameter setting unit 209 may set the utterance parameters depending on the result of analysis on an utterance sentence on the basis of a given exclamation mark or adverb, for example.

The adjustment based on a given exclamation mark or adverb may be made in, other than utterance parameter setting, motion setting by the motion setting unit 208. Here, exemplary utterance parameters and motion adjustment based on a given exclamation mark or adverb is described in Table 6 below.

TABLE 6

| Utterance sentence | Volume | Utterance speed | Hand motion | Whole body motion |
|---|---|---|---|---|
| "No. 1!!" | Relatively large | Quick | Sticking its finger (strong) | Dignifiedly (strong) |
| "Possibly No. 1" | Relatively small | Slow | Raising its finger without confidence (weak) | Modestly (weak) |

Further, exemplary utterance parameters and motion adjustment based on sentence ending particles is described in Table 7. Note that, a determination may be made in consideration also of symbols such as exclamation marks and the set expression of the character since a sentence ending particle alone does not clearly represent the intention in some cases.

TABLE 7

| Sentence ending particle | Intention | Criteria | Volume | Utterance speed |
|---|---|---|---|---|
| "yo" or "zo" | "Notice" | | | |
| "yo" or "zo" | "Attention, advice, or warning" | | | |
| "ne," "kke," "kana," or "na?" | "Confirmation or agreement" | "Sentence ending particle+?" | | |
| "ne" | "Kindness" | | | |
| "kana" or "ka" | "Question" | "Sentence ending particle+?" | | |
| "kana" or "ka" | "Soliloquy" | "Sentence ending particle+- - -" | Small | Slow |
| "naa," "na," or "waa" | "Admiration" | | | |
| "na" | "Forbidding" | | | |
| "ga" | "Scolding" | | | |
| "kane" | "Question" | | | |

(Scenario Description Unit 211)

The scenario description unit 211 adds, to the scenario, a description for synchronizing a motion assigned to a word/phrase with the corresponding word. For example, the scenario description unit 211 can refer to the position of each word/phrase (a time elapsed from the utterance start or how many words are there before the word/phrase) identified by the given word/phrase detection unit 207, and can make a motion. Further, the scenario description unit 211 also describes set utterance parameters in the scenario such that the set utterance parameters are considered when the corresponding word is said. For example, in a case where an utterance sentence is read aloud with the TTS function, parameters may be added such that the parameters are considered when the utterance sentence is read aloud.

As described above, in this system, the assignment of more natural motions and the setting of utterance parameters can be achieved with respect to utterance sentences generated in advance while a burden in creation is reduced.

Note that, herein, "motion" may include facial expressions (including the movements of eyes and mouth) as well as the movements of various parts of the body such as the hands, arms, head, upper body, whole body, and feet. Further, the facial expressions may be separately set in advance.

The motion setting unit 208 or the utterance parameter setting unit 209 may adjust motion setting or utterance parameter setting depending on a character expression set in advance to an utterance sentence. For example, in general, the motions for happy emotions are large, and the motions for sad emotions are small, and hence the motion setting unit 208 may adjust the intensity of a motion depending on a set expression (smile, troubled face, crying face, or the like). Further, in general, depressed voice comes along gloomy expressions, and bright voice comes along bright expressions, and hence the utterance parameter setting unit 209 may change the tone or volume of voice depending on a set facial expression.

Further, in voice synthesis such as TTS, in a case where there is a limit in voice expression, it is sometimes desired to embed recorded voice in a scenario. Even in such a case, the recorded voice may be converted into text by voice recognition, the text data (that is, utterance sentence) may be analyzed by the character utterance sentence analysis unit 201, an emotion may be determined and a motion may be set as in the above-mentioned example, and a description may be added to the scenario. Further, the emotion determination unit 204 can also obtain an emotion from the expression of recorded voice (voice tone, voice quality, breathing, speaking speed, or the like). Further, the emotion determination unit 204 may give priority to an emotion obtained from recorded voice over an emotion obtained by analyzing an utterance sentence.

Further, the emotion determination unit 204 in this system basically determines an emotion on the basis of analysis on an utterance sentence, but the present embodiment is not limited thereto. For example, the emotion determination unit 204 may make a determination on the basis of information externally input to the information processing apparatus 20.

For example, the emotion determination unit 204 may determine the emotion of the character on the basis of how the user touches the character (image or robot) (physical contact) or what word the user says to the character. The physical contact with the character may be detected by a touch sensor or the like, and what the user says to the character may be collected by a microphone. For example, the emotion determination unit 204 determines that the character has gotten a negative emotion in a case where there is negative input such as slapping or hitting the character or making offensive remarks to the character. Meanwhile, for example, the emotion determination unit 204 determines that the character has gotten a positive emotion in a case where there is positive input such as gently stroking the character or giving compliments to the character.

(User Utterance Recognition Unit 214, Scenario Control Unit 215, and Character Control Unit 216)

The control (execution) of the scenario can be achieved by the user utterance recognition unit 214, the scenario control unit 215, and the character control unit 216.

The user utterance recognition unit 214 performs voice recognition on the utterance voice of the user collected by the microphone to convert the utterance voice into text, to thereby perform natural language processing.

The scenario control unit 215 selects and generates a response (utterance sentence) that the character gives in response to the recognized utterance voice of the user on the basis of the scenario. Note that, the utterance of the character is not necessarily triggered by the utterance of the user and can be started on the basis of the scenario depending on locations, time, circumstances, or the like. The motions corresponding to the utterance sentences have already been described in the scenario by the scenario description unit 211 as described above.

The character control unit 216 performs character control under the control of the scenario control unit 215. Specifically, for example, the character control unit 216 outputs character voice from the output unit 230 (outputs synthesis voice) and reproduces a character image (motion video). How the voice and the video are synchronized with each other has already been described in the scenario by the scenario description unit 211 as described above so that the scenario control unit 215 can control the reproduction timings of the voice and video on the basis of the description in the scenario.

(Communication Unit 210)

The communication unit 210 is communicably connected to an external apparatus with a cable or wirelessly and transmits/receives data to/from the external apparatus. The communication unit 210 is communicably connected to the external apparatus by, for example, a wired/wireless LAN (Local Area Network), Wi-Fi (registered trademark), Bluetooth (registered trademark), a cell phone communication network (LTE (Long Term Evolution), or 3G (third generation mobile communication system)). For example, the information processing apparatus 20 may be communicably connected to a server on a network by the communication unit 210, to thereby acquire the scenario data, for example.

(Input Unit 220)

The input unit 220 is a device configured to receive input to the information processing apparatus 20 and output the input information to the control unit 200. For example, the input unit 220 may be an operation input unit, a voice input unit (microphone), a camera, or any sensor. Further, the operation input unit may be a touch sensor, pressure sensor, or proximity sensor (capacitive sensor or the like) that is provided integrally with a display unit. Alternatively, the operation input unit may be a physical component provided separately from the display unit, such as a button or a switch.

(Output Unit 230)

The output unit 230 is a device configured to perform output from the information processing apparatus 20. For example, the output unit 230 may be a display unit, a projector, or a voice output unit (speaker). The display unit may be a display apparatus, for example, a liquid crystal display (LCD) or an organic EL (Electroluminescence) display. The output unit 230 may present the character by images or voice under the control of the character control unit 216.

(Storage Unit 240)

The storage unit 240 is implemented by a ROM (Read Only Memory) configured to store programs and arithmetic parameters that are used in the processing of the control unit 200, and a RAM (Random Access Memory) configured to temporarily store parameters that are appropriately changed.

For example, the storage unit 240 stores the scenario data storage unit 242, the emotion co-occurrence word database 244, and the motion information database 246. The scenario data storage unit 242 store scenario data including utterance sentences. The emotion co-occurrence word database 244 stores data on co-occurrence words (or phrases) associated with emotions. The motion information database 246 stores emotion-based motion information corresponding to words or phrases (information regarding motions that the character takes).

In the above, the configuration of the information processing apparatus 20 according to the present embodiment is specifically described. Note that, the configuration of the information processing apparatus 20 according to the present embodiment is not limited to the example illustrated in FIG. 1. For example, of the functional components illustrated in FIG. 1, the tense analysis unit 202, the response selection unit 205, and the utterance parameter setting unit 209 may be omitted. Further, the user utterance recognition unit 214, the scenario control unit 215, and the character control unit 216, which are the functional components for scenario control (scenario execution), may be provided in another apparatus. Further, each database in the storage unit 240 may be stored in an external apparatus such as a server on a network.

Further, the information processing apparatus 20 may include a plurality of apparatuses.

Further, the information processing apparatus 20 may be, for example, a PC, a smartphone, a tablet terminal, a cell phone terminal, a handheld game console, a projector, a television apparatus, a see-through or non-see-through HMD (Head Mounted Display), or a robot.

Further, the input unit 220 and the output unit 230 may be provided in an external apparatus. In this case, for example, the information processing apparatus 20 may be a PC, a smartphone, or a server. The information processing apparatus 20 may be communicatively connected to the external apparatus configured to present the character (smartphone, projector, HMD, robot, or the like), and may transmit character control signals including data on the utterance voice and motion video of the character.

3. Motion Processing (3-1. Motion Generation Processing)

Figure 12:
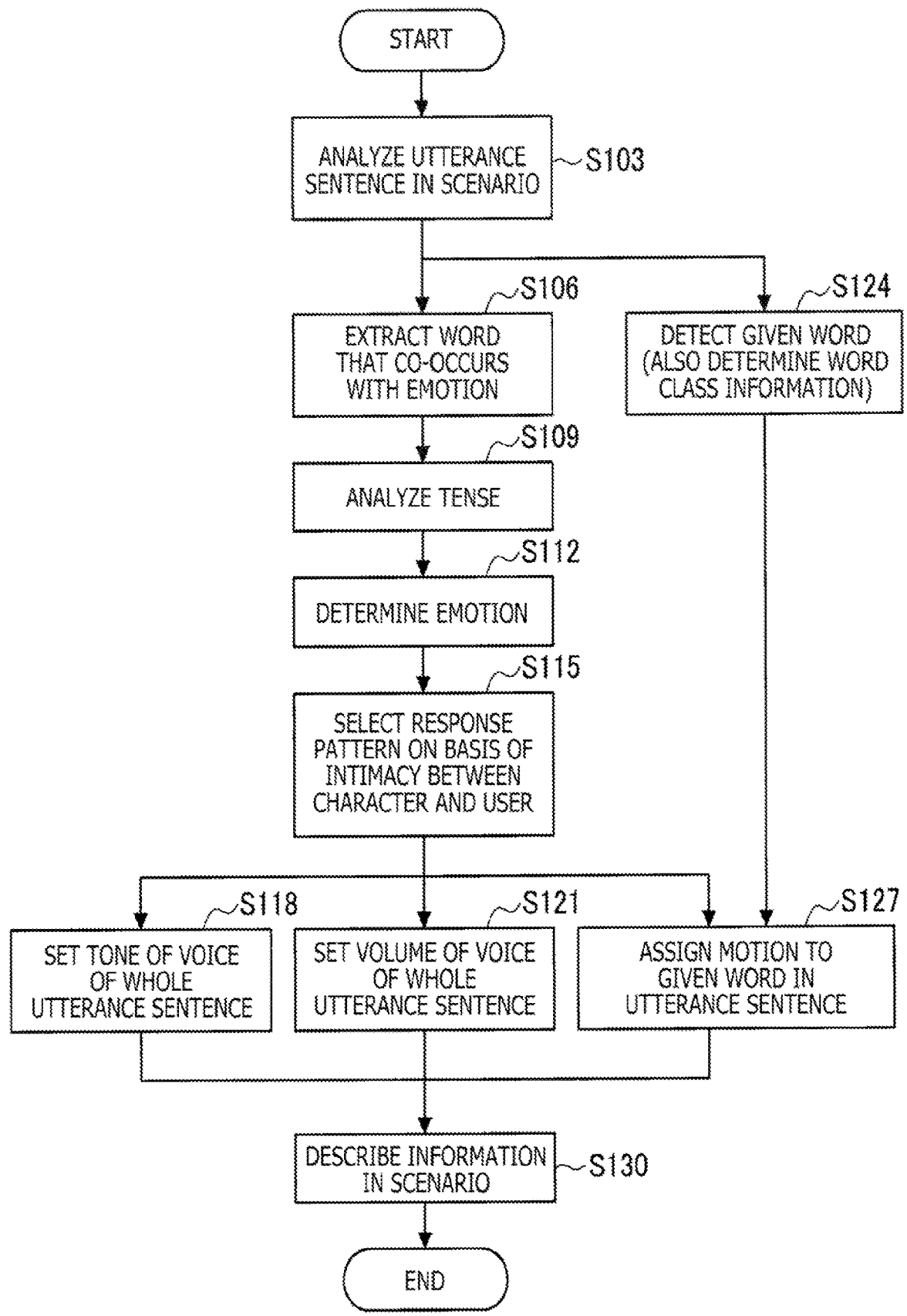
FIG. 12 is a flowchart illustrating an exemplary overall flow of a motion generation system according to the present embodiment.

Subsequently, the motion processing of the motion generation system according to the present embodiment is described with reference to FIG. 12. FIG. 12 is a flowchart illustrating an exemplary overall flow of the motion generation system according to the present embodiment.

As illustrated in FIG. 12, first, the character utterance sentence analysis unit 201 of the information processing apparatus 20 analyzes an utterance sentence in the scenario (that is, the utterance sentence of the character) by natural language processing (Step S103).

Next, the emotional expression extraction unit 203 refers to the emotion co-occurrence word database 244 on the basis of the result of analysis on the utterance sentence, thereby extracting a word that co-occurs with an emotion (emotional expression) from the utterance sentence (Step S106).

Then, the tense analysis unit 202 analyzes the tense of the utterance sentence (Step S109).

Next, the emotion determination unit 204 determines the emotion of the character by considering the emotional expression extraction result and the tense analysis result (Step S112).

Then, the response selection unit 205 selects a response pattern on the basis of the intimacy between the character and the user (Step S115).

Subsequently, the utterance parameter setting unit 209 sets, on the basis of the determined emotion and the selected response pattern, utterance parameters such as the voice tone of the whole utterance sentence and the voice volume of the whole utterance sentence (Steps S118 and S121).

Further, the given word/phrase detection unit 207 refers to the motion information database 246 on the basis of the result of analysis on the utterance sentence, thereby detecting a given word to which a motion has been assigned (Step S124). At this time, the given word/phrase detection unit 207 identifies the word class of the word and the position of the word in the utterance sentence.

Next, the motion setting unit 208 assigns, to the given word in the utterance sentence, a corresponding motion on the basis of the determined emotion (Step S127). Further, the motion setting unit 208 may adjust the intensity of the assigned motion depending on the selected response pattern.

Then, the scenario description unit 211 describes, in the scenario, the set utterance parameters and the assigned motion in association with the position of the corresponding word in the utterance sentence such that the reproduction of the utterance voice and the motion video are synchronized with each other (Step S130).

(3-2. Scenario Control Processing)

Subsequently, the scenario control processing is described with reference to FIG. 13. FIG. 13 is a sequence diagram illustrating exemplary scenario control processing according to the present embodiment.

As illustrated in FIG. 13, first, the emotional expression extraction unit 203 of the information processing apparatus 20 specifies, on the basis of the scenario, the utterance sentence and motion of the character (already described in the scenario as described above), to the character control unit 216 (Step S203).

Next, the character control unit 216 performs the control of reading the specified utterance sentence aloud with the TTS function or the like to output the utterance voice from the speaker and reproducing the corresponding motion video in synchronization with the output of the utterance voice (Step S206).

Then, in a case where the user has made an utterance, the user utterance recognition unit 214 performs voice recognition on voice data obtained by collecting the user utterance (Step S209).

Next, the scenario control unit 215 selects (identifies) an utterance sentence (response) that the character gives in response to the user utterance from the scenario (Step S212), and specifies the character utterance sentence and motion to the character control unit 216 (Step S215) as in Step S203.

Then, the character control unit 216 performs, as in Step S206, the control of reading the specified utterance sentence aloud with the TTS function or the like to output the utterance voice from the speaker and reproducing the corresponding motion video in synchronization with the output of the utterance voice (Step S218).

The processing described above is repeated so that the conversation with the character can be controlled on the basis of the scenario. Note that, here, as an example, the scenario in which the character has a conversation with the user is described, but the present embodiment is not limited thereto. The character may talk at the user depending on the progress of a video game or the like, or the character may automatically make utterances depending on the user's location or state.

4. Conclusion

As described above, in the motion generation system according to the embodiment of the present disclosure, the emotion of a character is determined, and a motion is selected, depending on the determined emotion, to a given word or phrase extracted from the utterance sentence of the character, to thereby make it possible to assign a more natural motion reflecting the emotion of the character.

In the above, the preferred embodiment of the present disclosure has been described in detail with reference to the accompanying drawings, but the present technology is not limited to the example. It is obvious that various changes or modifications could be arrived at by persons who have ordinary knowledge in the technical field to which the present disclosure belongs within the scope of the technical ideas described in the appended claims, and it is therefore understood that such changes or modifications naturally belong to the technical scope of the present disclosure.

For example, it is possible to create a computer program for causing the hardware such as the CPU, ROM, and RAM built in the information processing apparatus 20 described above to exhibit the function of the information processing apparatus 20. Further, a computer-readable storage medium having stored therein the computer program is also provided.

Further, the effects described herein are merely illustrative or exemplary and are not limited. That is, the technology according to the present disclosure may provide other effects that are obvious for persons skilled in the art from the description of the present specification, in addition to or in place of the above-mentioned effects.

Note that, the present technology can also take the following configurations.

(1)

An information processing apparatus including:
a control unit configured to perform processing of
determining an emotion on the basis of a result of utterance sentence analysis performed on an utterance sentence of a character included in a scenario,
selecting, depending on a content of the utterance sentence and the emotion determined, a motion of the character that is synchronized with the utterance sentence, and
adding, to the scenario, a description for adjusting presentation of the selected motion to match a voice output timing of the utterance sentence.

(2)

The information processing apparatus according to Item (1), in which the control unit selects, depending on a word detected from the utterance sentence and a word class of the word, a motion associated with the emotion determined from emotion-based motions associated with the word.

(3)

The information processing apparatus according to Item (1) or (2), in which the control unit adjusts a magnitude of the motion depending on intimacy between the character and a user.

(4)

The information processing apparatus according to any one of Items (1) to (3), in which the control unit refers to a database of co-occurrence words corresponding to emotions, and determines an emotion corresponding to a word detected from the utterance sentence as an emotion of the character.

(5)

The information processing apparatus according to Item (4), in which the control unit analyzes a tense on the basis of the result of utterance sentence analysis on the utterance sentence, and the control unit changes, depending on the tense, a degree of the emotion corresponding to the word or the emotion of the character.

(6)

The information processing apparatus according to any one of Items (1) to (5), in which the control unit continues, as an emotion of the character, the emotion determined until a certain time has elapsed thereafter or another emotion has been newly determined.

(7)

The information processing apparatus according to any one of Items (1) to (6), in which the control unit reduces a degree of the emotion determined, depending on an elapsed time thereafter or the number of utterances.

(8)

The information processing apparatus according to Item (6) or (7), in which the control unit selects a motion associated with the emotion from emotion-based motions associated with a given word detected from an utterance sentence that is uttered in a period during which the emotion continues or a degree of the emotion is higher than a threshold.

(9)

The information processing apparatus according to any one of Items (1) to (8), in which the control unit sets, depending on the emotion, an utterance voice parameter that is used in outputting the utterance sentence as voice.

(10)

The information processing apparatus according to any one of Items (1) to (8), in which the control unit sets, depending on a word that is used in the utterance sentence, an utterance voice parameter that is used in outputting the utterance sentence as voice.

(11)

The information processing apparatus according to Item (9) or (10), in which the control unit performs processing of adding, to the scenario, a description in which the utterance voice parameter set is associated with the utterance sentence.

(12)

An information processing method including performing, by a processor, the processing of:
  determining an emotion on the basis of a result of utterance sentence analysis performed on an utterance sentence of a character included in a scenario;
  selecting, depending on a content of the utterance sentence and the emotion determined, a motion of the character that is synchronized with the utterance sentence; and
  adding, to the scenario, a description for adjusting presentation of the selected motion to match a voice output timing of the utterance sentence.

(13)

A program for causing a computer to function as a control unit configured to perform the processing of:
  determining an emotion on the basis of a result of utterance sentence analysis performed on an utterance sentence of a character included in a scenario;
  selecting, depending on a content of the utterance sentence and the emotion determined, a motion of the character that is synchronized with the utterance sentence; and
  adding, to the scenario, a description for adjusting presentation of the selected motion to match a voice output timing of the utterance sentence.

REFERENCE SIGNS LIST

20: Information processing apparatus
200: Control unit
201: Character utterance sentence analysis unit
202: Tense analysis unit
203: Emotional expression extraction unit
204: Emotion determination unit
205: Response selection unit
207: Given word/phrase detection unit
208: Motion setting unit
209: Utterance parameter setting unit
210: Communication unit
211: Scenario description unit
214: User utterance recognition unit
215: Scenario control unit
216: Character control unit
220: Input unit
230: Output unit
240: Storage unit
242: Scenario data storage unit
244: Emotion co-occurrence word database
246: Motion information database

The invention claimed is:

1. An information processing apparatus, comprising:
circuitry configured to:
  determine, based on a result of analysis of a first utterance sentence of a plurality of utterance sentences, a first emotion corresponding to the first utterance sentence of a character included in a scenarios;
  select a response attitude pattern from a plurality of response attitude patterns, based on each of the determined first emotion and an intimacy between the character and a user, wherein each of the plurality of response attitude patterns is mapped with corresponding emotion levels and intimacy levels;
  select, based on a content of the first utterance sentence and the determined first emotion, a first motion of a plurality of motions for the character that is synchronized with the first utterance sentence;
  adjust a movement speed of the selected first motion based on the selected response attitude pattern; and
  add, to the scenario, a description for adjustment of presentation of the selected first motion to match a voice output timing of the first utterance sentence.

2. The information processing apparatus according to claim 1, wherein
the circuitry is further configured to select, based on a word from the first utterance sentence and a word class of the word, the first motion associated with the determined first emotion, and
the first motion is selected from emotion-based motions associated with the word.

3. The information processing apparatus according to claim 2, wherein the circuitry is further configured to:
refer to a database of co-occurrence words corresponding to a plurality of emotions, and
determine an emotion corresponding to the word from the first utterance sentence as the first emotion of the character.

4. The information processing apparatus according to claim 3, wherein the circuitry is further configured to:
analyze a tense of the first utterance sentence based on the result of analysis of the first utterance sentence, and
change, based on the tense, a degree of the first emotion corresponding to the word or the first emotion of the character.

5. The information processing apparatus according to claim 2, wherein the circuitry is further configured to set, based on the word in the first utterance sentence, an utterance voice parameter to output the first utterance sentence as voice.

6. The information processing apparatus according to claim 1, wherein the circuitry is further configured to continue the determined first emotion until one of a specific time has elapsed or a second emotion is determined.

7. The information processing apparatus according to claim 6, wherein
the circuitry is further configured to:
determine, based on a result of analysis of a second utterance sentence of the plurality of utterance sentences, the second emotion corresponding to the second utterance sentence; and
select, based on a content of the second utterance sentence and the determined second emotion, a second motion of the plurality of motions for the character that is synchronized with the second utterance sentence.

8. The information processing apparatus according to claim 1, wherein the circuitry is further configured to set, based on the first emotion, an utterance voice parameter that is used to output the first utterance sentence as voice.

9. The information processing apparatus according to claim 8, wherein the circuitry is further configured to add, to the scenario, a description in which the utterance voice parameter is associated with the first utterance sentence.

10. The information processing apparatus according to claim 1, wherein the circuitry is further configured to reduce a degree of the first emotion, based on one of an elapsed time or a number of utterance sentences.

11. An information processing method, comprising:
determining, based on a result of analysis of a first utterance sentence of a plurality of utterance sentences, a first emotion corresponding to the first utterance sentence of a character included in a scenario;
selecting a response attitude pattern from a plurality of response attitude patterns, based on each of the determined first emotion and an intimacy between the character and a user, wherein each of the plurality of response attitude patterns is mapped with corresponding emotion levels and intimacy levels;
selecting, based on a content of the first utterance sentence and the determined first emotion, a first motion of a plurality of motions for the character that is synchronized with the first utterance sentence;
adjusting a movement speed of the selected first motion based on the selected response attitude; and
adding, to the scenario, a description for adjustment presentation of the selected first motion to match a voice output timing of the first utterance sentence.

12. A non-transitory computer-readable medium having stored thereon, computer-executable instructions which, when executed by a computer, cause the computer to execute operations, the operations comprising:
determining, based on a result of analysis of a first utterance sentence of a plurality of utterance sentences, a first emotion corresponding to the first utterance sentence of a character included in a scenario;
selecting a response attitude pattern from a plurality of response attitude patterns, based on each of the determined first emotion and an intimacy between the character and a user, wherein each of the plurality of response attitude patterns is mapped with corresponding emotion levels and intimacy levels;
selecting, based on a content of the first utterance sentence and the determined first emotion, a first motion of a plurality of motions for the character that is synchronized with the first utterance sentence;
adjusting a movement speed of the selected first motion based on the selected response attitude pattern; and
adding, to the scenario, a description for adjustment presentation of the selected first motion to match a voice output timing of the first utterance sentence.

* * * * *